Oct. 1, 1957 A. B. ACIEGO 2,807,886

PENCIL AND TAPE HOLDER

Filed April 5, 1956

INVENTOR.
ALFONSO B. ACIEGO
BY Elliott & Pastoriza
ATTORNEYS 2,807,886

PENCIL AND TAPE HOLDER

Alfonso B. Aciego, Lawndale, Calif.

Application April 5, 1956, Serial No. 576,299
7 Claims. (Cl. 33—189)

This invention relates to holders and more particularly to a holding means for securing a tape casing and marking device in a pre-determined relationship with respect to each other whereby the taking of measurements and marking off of distances is greatly facilitated.

Combined marking devices and tape measures are well known in the art. Many such prior art devices, for example, comprise a conventional tape casing housing a flexible tape adapted to be withdrawn or unrolled from a reel within the casing. A marking device in the form of a crayon or pencil is secured to the casing so that dimension lines may be drawn as the tape is simultaneously unreeled from the casing. Other devices simply provide a combination tape and pencil means for the convenience of the user in having each of the implements readily available.

The present invention has for its primary object the provision of an improved holder for conveniently supporting a roller tape casing and pencil in a pre-determined relationship whereby marking off of definite distances is greatly facilitated. The holder itself is so constructed that conventional tapes and pencils may be used without any modification of these separate implements.

Another important object is to provide a holder of the above type which is extremely simple and economical to manufacture, and which may be easily attached to and carried by a person in a convenient position for immediate use.

Still another important object is to provide a holder for securing a measuring tape and pencil in such relationship that measurements may be made and marked off by use of only one hand, whereby measuring operations are not only facilitated but accomplished in less time than has heretofore been necessary.

These and other objects and advantages of the present invention are attained by providing a holder formed from a single integral strip bent into a generally rectangular shape for receiving a conventional measuring tape casing. A forwardly extending portion on the strip is folded back on itself to provide a frictional securing means at the fold for a marking device such as a pencil. The axis of the fold is inclined with respect to the edges of the rectangular shape whereby a pencil inserted within the fold may have its point positioned immediately adjacent one longitudinal edge of the tape upon withdrawal of the tape from the casing. When a measurement is made it is a simple matter to rock the entire holder or simply push the pencil, whereby the pencil will mark a point immediately adjacent one of the index lines on the tape.

The folded back portion of the holder extends a sufficient distance to form, in co-operation with one side of the rectangular shape, a gripping means whereby the holder may be clipped onto a person's belt or pocket top for convenient carrying purposes.

A better understanding of the invention will be had by referring to the accompanying drawings in which.

Figure 1:
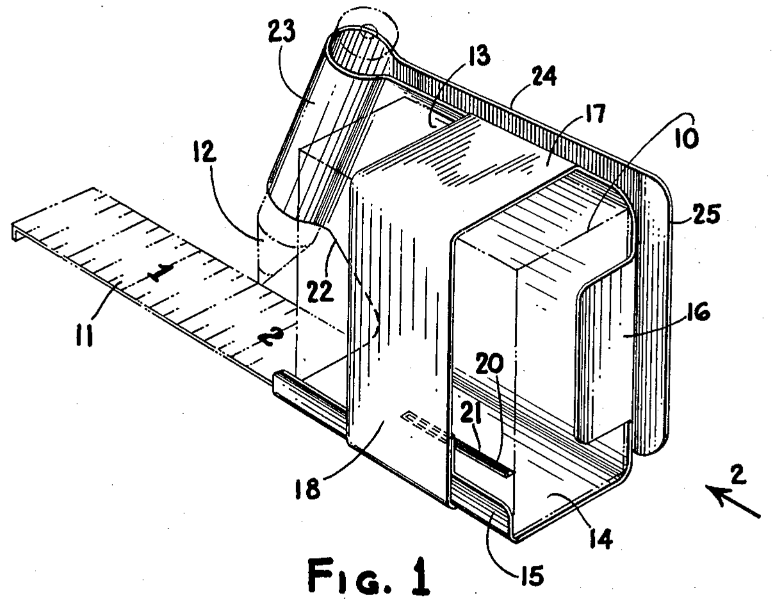
Figure 1 is a perspective view of the holder of this invention.
Figure 2:
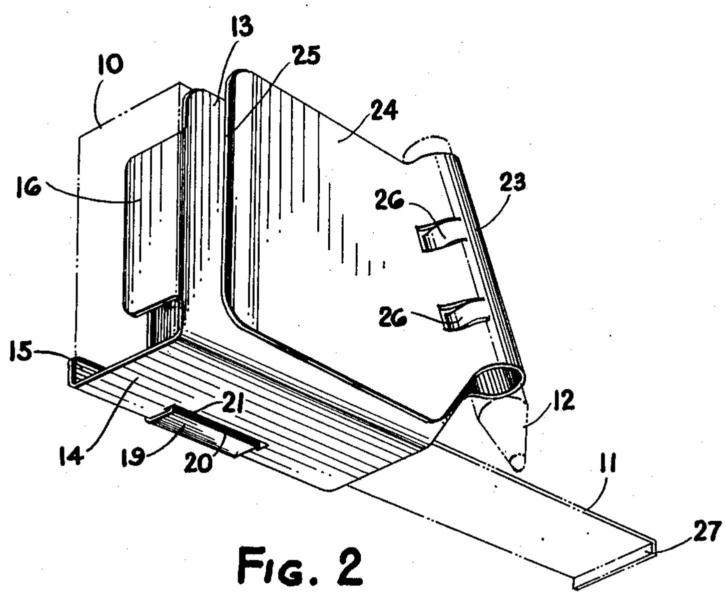
Figure 2 is another perspective taken from the lower back side of the holder in the direction of the arrow 2 of Figure 1.

Referring to both Figures 1 and 2, the holding device of this invention is designed to support a tape casing 10 including a conventional flexible metal tape 11 indicated in phantom lines, in co-operative relationship with a marking device in the form of a pencil 12. For this purpose, the holder comprises an integral strip having a back wall portion 13 bent at substantially right angles to form a base portion 14. The base portion 14 terminates in an upwardly turned edge providing a flange 15 whereby the flange, base portion 14, and lower portion of the back wall 13 define a shallow channel for receiving the tape casing 10. One end of the back wall portion 13 in the form of an integral tab extension 16 is bent inwardly about an axis normal to the plane of the base portion 14 to define a stop at the rear end of the channel whereby movement of the tape casing 10 in this direction is limited.

As shown best in Figure 1, a narrowed strap portion 17 extends from the top of the back wall portion 16 in a direction over and substantially parallel to the base portion 14. The strap portion 17 then turns downwardly as at 18 to extend past the flange 15. As best seen in Figure 2, the end 19 of the down turned portion 18 passes under the base portion 14 terminating in an upwardly directed tongue 20 received in a longitudinal slot 21 in the base portion. The integral strip is thus closed on itself to define a substantially rectangular shape, the back wall portion 13 and down turned portion 18 defining two sides of the rectangle, and the top strap portion 17 and base portion 14 of the channel defining the top and bottom portions of the rectangle.

The back wall portion 13 is provided with a forwardly extending portion 22 adjacent the front entrance of the channel. This forwardly extending portion is folded back on itself as at 23 to form a cylindrical shaped fold adapted to frictionally secure the pencil 12. The folded back portion of the integral strip extends in parallel spaced relationship to the back wall 13 as indicated at 24 and serves to define a gripping means or clip whereby the holder may be readily secured in a person's belt or pocket top. For this purpose, the rear end of the folded back portion 24 is flared slightly at 25 whereby the clip may be readily applied to the belt or pocket portion of a garment.

In Figure 2, it will be noted that the cylindrical shaped fold 23 is provided with tab sections 26 cut in the wall of the fold and biased inwardly to exert a pressure against the pencil 12. The pressure is such that the pencil 12 is securely held but may be slidably adjusted so that the point thereof may be positioned adjacent one edge of the tape 11 upon withdrawal from the casing 10. Preferably, the axis of the fold 23 is inclined with respect to the edges of the strap portion of the rectangular shape supporting the casing so that the point of the pencil may be easily positioned adjacent the tape edge clear of the remaining portion of the holder.

In operation, the holder for securing the tape casing and pencil may be handled with one hand, the conventional downward flange 27 on the extreme end of the tape itself serving to hold the tape against one edge of a piece of work to be measured. With the end portion 27 of the tape properly held, the tape is simply withdrawn from the casing 10 by pulling the holder away from the edge of the work. When the desired dimension is observed on the tape, a simple manual rocking movement of the holder will cause the tip of the pencil 12 to mark the work adjacent the proper index point on the tape. Alternatively, the upper end of the pencil 12 may simply be pushed to mark a point adjacent the tape.

From the above description it will be readily apparent that the present invention provides an extremely simple holder whereby a conventional tape casing and pencil may be secured in a pre-determined relationship with respect to each other so that the measurement and marking of dimensions is greatly facilitated. By forming the holding device out of a single integral strip, its manufacture may be performed in an extremely economical manner. Further, there are no moving parts and the like to get out of order. The strip itself is of a springy material to retain its set shape, but may be easily flexed without taking on a permanent set so that the marking device such as the pencil or the tape casing 10, or both may be readily removed.

The feature of the folded back portion 24 co-operating with the back wall portion 13 to provide a relatively large area clip which enables the holder to be retained by a person in a convenient position for ready use.

Modifications falling within the scope and spirit of the present invention will occur to those skilled in the art. The particular shape of the holder chosen for illustrative purposes is, therefore, not to be thought of as limiting the feature of a single integral strip capable of properly securing a tape casing and pencil in a desired pre-determined relationship.

What is claimed is:

1. A holder for supporting a tape casing and marking device in predetermined relationship with respect to each other comprising: a single integral strip bent into a rectangular shape to support said tape casing, a side wall of said rectangular shape, normal to the plane of the tape upon withdrawal thereof from said casing, having a forwardly extending portion coplanar with said side wall for a given distance and thence folded back on itself to define a securing means for supporting said marking device within the fold.

2. A holder according to claim 1, in which the axis of said fold is inclined with respect to the side edges of said rectangular shape whereby the marking point of said marking device may be positioned immediately adjacent one edge of said tape upon withdrawal thereof from said casing.

3. A holder according to claim 2, in which said extending portion folds back on itself a sufficient distance to define, with said side wall of said rectangular shape, a gripping means.

4. A holder comprising: an integral strip bent at substantially right angles to form a back wall portion and a base portion, the edge of said base portion being bent upwardly through a second right angle to form a flange, said flange and base portion defining a shallow channel adapted to receive a tape casing; an end portion on said back wall bent about an axis normal to the plane of said base portion to define a stop at the rear end of said channel for limiting movement of said tape casing; a narrowed strap portion extending from the top of said back wall portion in a direction parallel to and over said base portion for a distance corresponding to at least the width of said channel, thence turning downwardly in a direction parallel to said back wall past said base portion, said strap having an inwardly turned portion passing under said edge of said base portion and terminating in an upwardly directed tongue, said base portion having slot means receiving said tongue; a forward portion forming an extension of said back wall beyond the front portion of said channel, said forward portion being folded back on itself to define a cylindrical portion adjacent the front end of said channel at said fold for securing a marking device, the folded back portion extending rearwardly in spaced parallel relationship to said back wall portion to define therewith a gripping means.

5. A holder according to claim 4, in which the axis of said fold is inclined with respect to the side edges of said strap portion whereby the marking point of said marking device may be positioned adjacent one edge of the tape upon withdrawal of said tape from said casing.

6. A holder according to claim 5, in which said cylindrical portion includes tab sections cut in its surface, said tab sections being biased inwardly to grip said marking device to hold it in a position adjacent the front portion of said channel whereby a distance measured by said tape may be readily marked upon rocking movement of said holder.

7. A holder according to claim 6, in which said folded back portion terminates in a flared end directed away from the back wall portion to define an entrance to facilitate application of said gripping means.

References Cited in the file of this patent

UNITED STATES PATENTS

| | | |
|---|---|---|
| 588,129 | Clough | Aug. 17, 1897 |
| 2,112,179 | Sharrar | Mar. 22, 1938 |
| 2,651,843 | Goodford | Sept. 15, 1953 |